US012308522B1

(12) United States Patent
Vaidyaraman

(10) Patent No.: US 12,308,522 B1
(45) Date of Patent: May 20, 2025

(54) FOLDABLE REFLECTARRAY ANTENNA

(71) Applicant: Anjana Vaidyaraman, Redmond, WA (US)

(72) Inventor: Anjana Vaidyaraman, Redmond, WA (US)

( * ) Notice: Subject to any disclaimer, the term of this patent is extended or adjusted under 35 U.S.C. 154(b) by 0 days.

(21) Appl. No.: 18/129,850

(22) Filed: Apr. 1, 2023

(51) Int. Cl.
*H01Q 15/18* (2006.01)
*H01Q 15/14* (2006.01)

(52) U.S. Cl.
CPC ........... *H01Q 15/18* (2013.01); *H01Q 15/141* (2013.01); *H01Q 15/147* (2013.01)

(58) Field of Classification Search
CPC .... H01Q 15/18; H01Q 15/141; H01Q 15/147; H01Q 15/20; H01Q 15/14
See application file for complete search history.

(56) References Cited

U.S. PATENT DOCUMENTS

| | | | | |
|---|---|---|---|---|
| 5,933,124 | A * | 8/1999 | Sakimura | H01Q 15/20 343/915 |
| 10,978,809 | B2 * | 4/2021 | Visentin | H01Q 23/00 |
| 11,990,665 | B2 * | 5/2024 | Ring | H01Q 21/062 |

* cited by examiner

*Primary Examiner* — Graham P Smith
(74) *Attorney, Agent, or Firm* — Plager Schack LLP; Mark H. Plager, Esq.; Naomi Mann, Esq.

(57) ABSTRACT

Disclosed is a foldable reflectarray antenna having a circular disk geometry, with folding hinges that converge about the antenna's center and are configured to enable the antenna to fold according to an origami waterbomb crease pattern. This achieves a high packing efficiency, as well as a high aperture efficiency.

8 Claims, 4 Drawing Sheets

FOLDABLE REFLECTARRAY ANTENNA

BACKGROUND

The present disclosure relates generally to antenna systems, and more specifically to foldable reflectarray antennas.

Smaller satellites deployed into space are limited in the size of the antenna they can carry. As smaller sized antennas may have decreased communication efficiency, such systems may seek to maximize antenna size by using a foldable antenna with the aim of maximizing its packing efficiency while maintaining a high aperture efficiency which affects the antenna's ability to efficiently receive signals. To achieve a high packing efficiency, shapes with low rotational symmetry, such as squares and hexagons, have been used but have typically resulted in compromised aperture efficiency. On the other hand, circular designs with better aperture efficiency may typically result in decreased packing efficiency, meaning that the antenna is not using its folded volume efficiently enough.

As such, an improved system providing a foldable antenna with high packing and aperture efficiency is desirable.

SUMMARY

According to various embodiments, disclosed is a foldable reflectarray antenna having a circular/disk geometry, with folding hinges that converge about the antenna's center to enable the antenna to fold according to an origami waterbomb crease pattern.

The disclosed antenna design and folding pattern provides a near perfect packing and aperture efficiency, thus taking up minimal volume when folded while being efficient at receiving signals.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
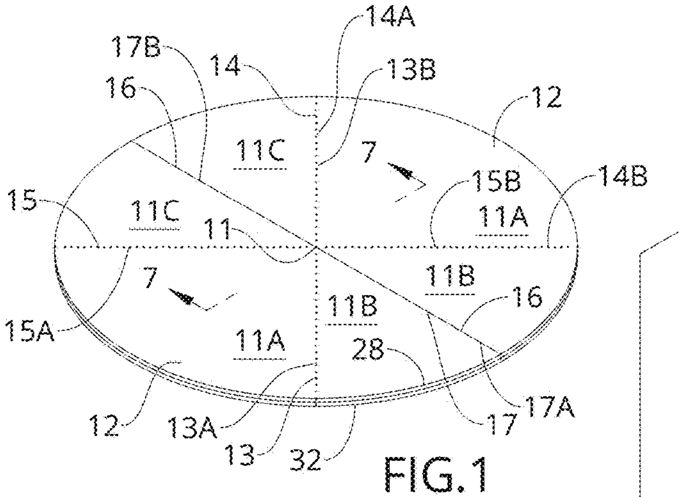
FIG. 1 is a top perspective view of an antenna, shown in an unfolded configuration, according to various embodiments.
Figure 2:
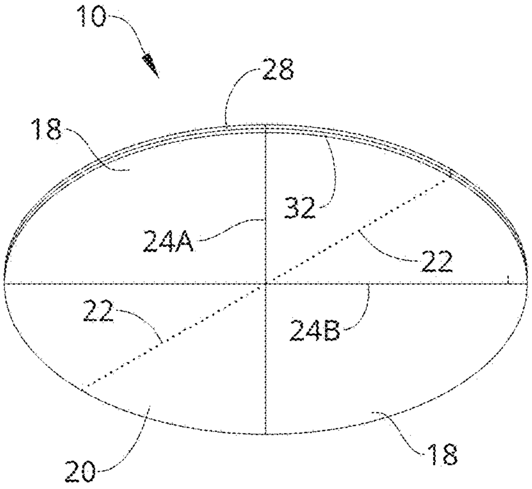
FIG. 2 is a bottom perspective view of the antenna shown in FIG. 1.
Figure 3:
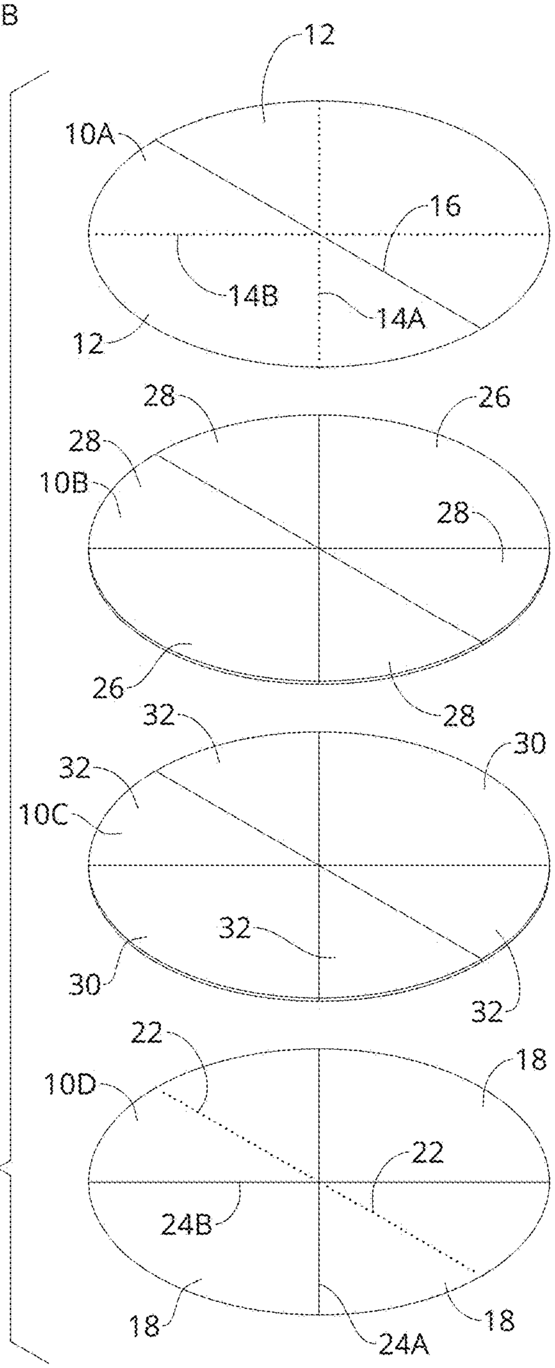
FIG. 3 is an exploded view thereof.

According to various embodiments as depicted in FIGS. 1-9 disclosed is a foldable reflectarray antenna 10 ("antenna 10"), having body of circular/disk geometry, with folding hinges that converge about the antenna's center 11 or hinge convergence point. The folding hinges are configured to enable the antenna to fold according to an origami waterbomb crease pattern. This achieves a high packing efficiency, as well as a high aperture efficiency.

In certain embodiments, antenna 10 may comprise a first straight hinge line 13 which traverses through center 11 and across opposite edges of the antenna 10 (i.e., antenna body) to create a first folding hinge 13A and a second folding hinge 13B. Antenna 10 may further comprise a second straight hinge line 15 which traverses through center 11 and across opposite edges of the antenna to create a third folding hinge 15A and a fourth folding hinge 15B, wherein second straight hinge line 15 is perpendicular to first straight hinge line 13. Antenna 10 may further comprise a third straight hinge line 17 which traverses through center 11 and across opposite edges of the antenna to create a fifth folding hinge 17A and a sixth folding hinge 17B, wherein third straight line 17 cuts midway between first folding hinge 13A and fourth folding hinge 15B and also cuts midway between second folding hinge 13B and third folding hinge 15A, as shown. Together, first straight hinge line 13, second straight hinge line 15, and third straight line 17 define six antenna segments, including a first pair 11A of opposing 90-degree segments, a second pair 11B of adjacent 45-degree segments separated from one another by the fifth folding hinge 17A, and a third pair 11C of adjacent 45-degree segments separated from one another by the sixth folding hinge 17B, as shown.

In certain embodiments, antenna 10 may generally comprise a top Kapton® film layer 10A ("top film layer 10A"), a layer comprising reflectarray panels 10B ("panel layer 10B") below top layer 10A, a layer comprising a polylactic acid backing 10C ("backing layer 10C") below panel layer 10B, and a bottom Kapton® film layer 10D ("bottom film layer 10D") below backing layer 10C. In certain embodiments, panel layer 10B may be bonded to backing layer 10C via adhesive (e.g., Epoxy). In certain embodiments, top film layer 10A and bottom film layer 10D may include cuts and creases that create folding hinges 13A-B, 15A-B, and 17A-B, and further define first, second, and third pairs of antenna segments 11A, B, and C, respectively. In certain embodiments, panel layer 10B may comprise segments corresponding to antenna segments 11A, B, and C. In further embodiments, backing layer may be cut in correspondence to the folding hinges and antenna segments.

In certain embodiments, top film layer 10A may comprise a top layer cut 16 which constructs third straight hinge line 17. Top layer 10A may further comprise a first top layer crease 14A which constructs first straight hinge line 13, and a second top layer crease 14B which constructs second straight hinge line 15. First crease 14A, second crease 14B, and cut 16 define 6 non-folding top layer segments 12, which correspond to antenna segments 11A, B, and C. In certain embodiments, cut 16 creates a complete separation between the sections through which it cuts within top layer 10A.

In certain embodiments, bottom film layer 10D may comprise a bottom layer crease 22 which constructs third straight hinge line 17, and aligns with top layer cut 16. Bottom layer 10D may further comprise a first bottom layer cut 24A which constructs first straight hinge line 13 and aligns with first top layer crease 14A. Bottom layer 10D may further comprise a second bottom layer cut 24B which constructs second straight hinge line 15 and aligns with second top layer crease 14B. First bottom layer cut 24A, second bottom layer cut 24B, and bottom layer crease 22 define 6 non-folding bottom layer segments 18, which correspond to antenna segments 11A, B, and C and align with top layer segments 12. In certain embodiments, cuts 24A and B create complete separation between the sections through which they cut within bottom layer 10D.

In certain embodiments, panel layer 10B may comprise 6 reflectarray panels which correspond to antenna segments 11A, B, and C, and align with top layer segments 12 and bottom layer segments 18. In embodiments, the reflectarray panels of panels layer 10B include a first pair of large reflectarray panels 26, which are oppositely disposed and construct the first pair 11A of 90-degree segments of antenna 10. The reflectarray panels of panels layer 10B further include a second and third pair of small reflectarray panels 28, which construct the second and third pair 11B, 11C of adjacent 45 degree segments of antenna 10. In some embodiments, each of the 6 reflectarray panels may be entirely separated from one another within panel layer 10B. In further embodiments, backing panel 10C provides a polylactic acid backing to which each of the reflectarray panels of layer 10B are attached via adhesive. In some embodiments, backing layer 10C may comprise cuts which correspond to first straight hinge line 13, second straight hinge line 15, and third straight line 17. These cuts define six sections including a first pair of large polylactic acid backing panels 30 which are bonded to the first pair of large reflectarray panels 26; and second and third pairs of small polylactic acid backing panels 32 which are bonded to the second and third pair of small reflectarray panels 28.

Figure 4:
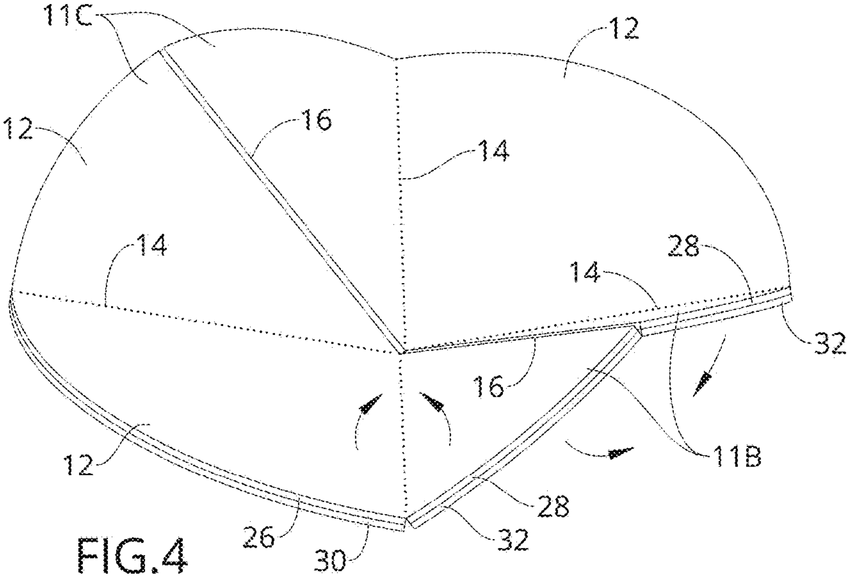
FIG. 4 illustrates the antenna in a partially folded configuration, after an initial folding step.
Figure 5:
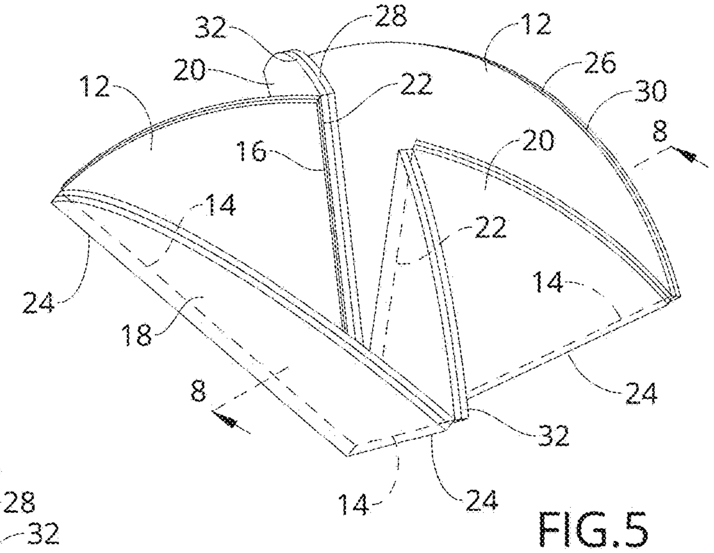
FIG. 5 illustrates the antenna in a further partially folded configuration, after a subsequent folding step.
Figure 6:
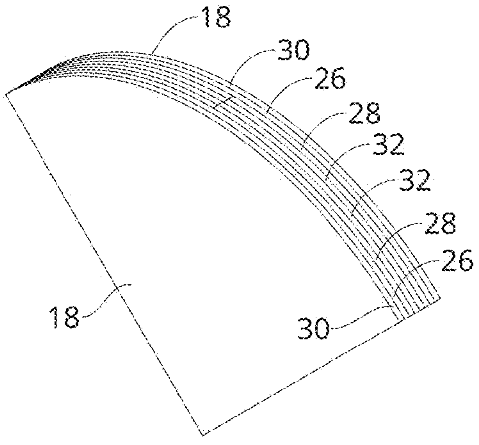
FIG. 6 illustrates the antenna in a fully folded configuration.
Figure 7:
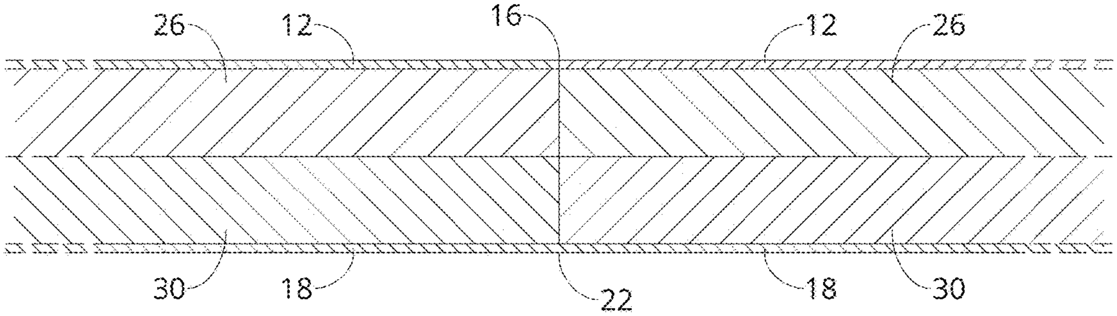
FIG. 7 is a section view taken along line 7-7 of FIG. 1.
Figure 8:
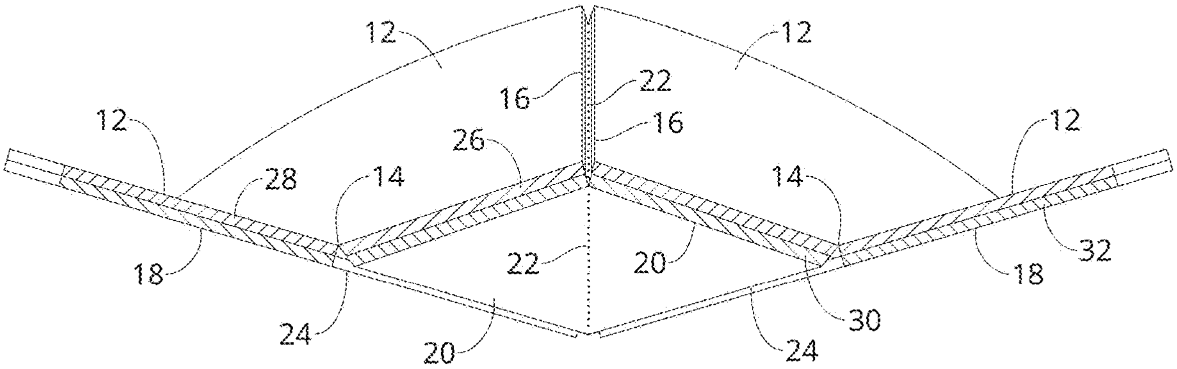
FIG. 8 is a section view taken along line 8-8 of FIG. 5.
Figure 9:
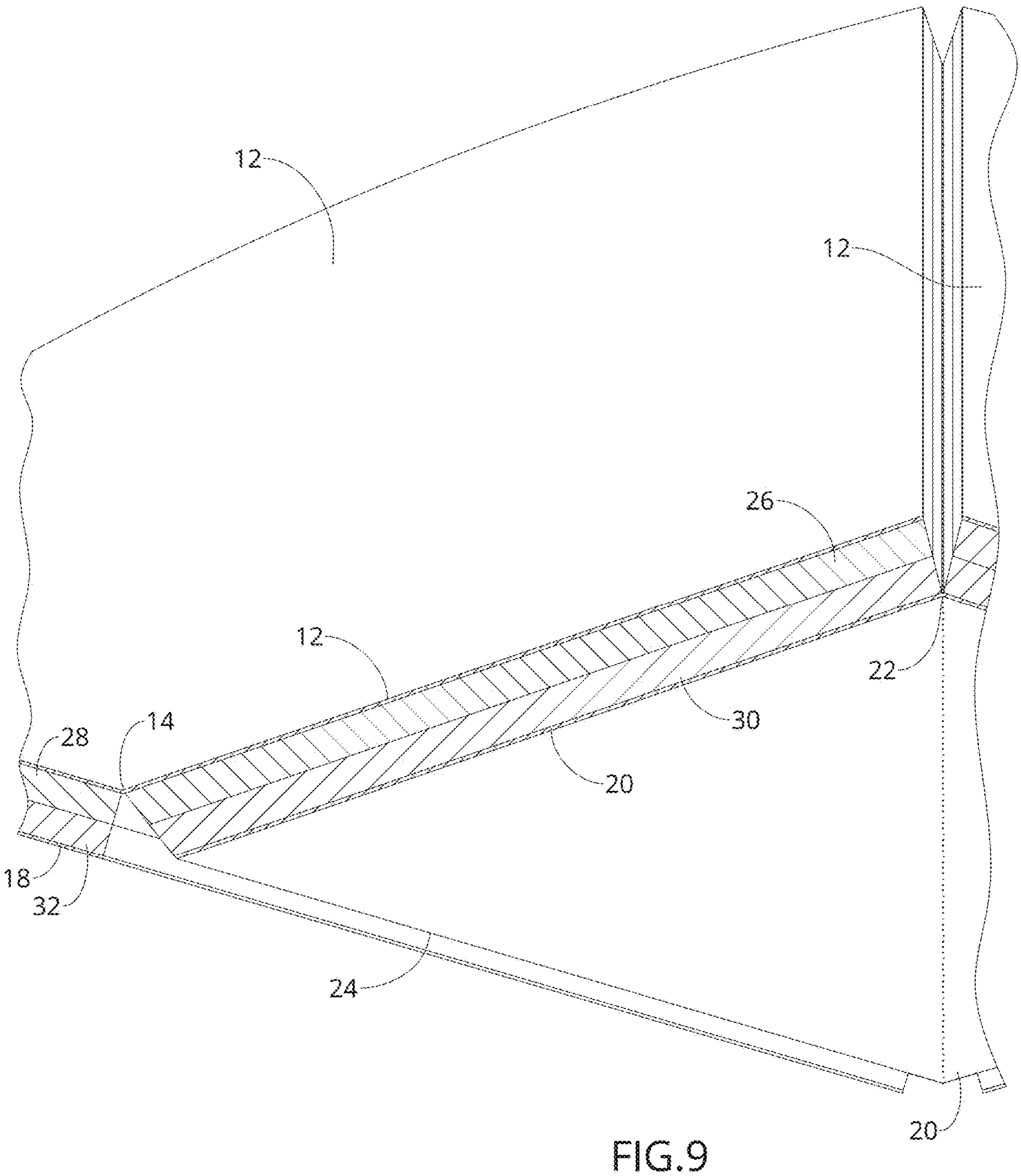
FIG. 9 is a detailed section view of the antenna.

In embodiments as best depicted in FIGS. 4-6, antenna 10 may be folded by overlapping and inwardly bringing together both segments in the second pair 11B of adjacent 45-degree segments, and by doing the same with both segments in the third pair 11C of adjacent 45-degree segments. This results in a folded antenna surface area which is equal to a fourth of the unfolded surface area. The antenna 10 may easily be deployed from its folded position by pulling apart the folded segments. Thus, antenna 10 may be folded for launch inside a small satellite and easily deployed once it reaches space. The circular design of the antenna provides nearly perfect aperture efficiency, and the folded form has no gaps in its center, giving it perfect packing efficiency.

It shall be appreciated that antenna 10 may be manufactured and assembled using any known techniques in the field. In certain embodiments, backing panel 10C may be 3D printed, and the reflectarray panels may be attached to their matching locations in the backing panel using epoxy adhesive. The Kapton® membranes (i.e., film) may then be attached to the top and bottom sides of the antenna. Necessary cuts may then be made in the membranes to allow for folding.

It shall be appreciated that the size, components, and/or materials of antenna 10 may vary in alternate embodiments based on factors such as application needs, design requirements, design preferences, cost, material availability, etc. It shall be appreciated that antenna 10 may have different geometric configurations in alternate embodiments and may have a non-circular design in alternate embodiments.

It shall be appreciated that the disclosed device and system can have multiple configurations in different embodiments and may further be used for different applications which may benefit from or require compact and portable antennas. Furthermore, the reflectarray panels may be modified and various parts may be added or removed from the panels in alternate embodiments, based on the specific application/use. As such, use of the disclosed system is not limited to only space. As non-limiting examples, the disclosed antenna may be adapted for military purposes or used as an easily portable backup antenna during disasters, for travel, recreation, etc. It shall be appreciated that the device and system described herein may comprise any alternative known materials in the field and be of any size and/or dimensions. For example, the panels may be designed differently for use in space versus use on land. Additionally, different materials may replace the Kapton® membranes, and/or adhesive in alternate embodiments.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A foldable antenna comprising:

an antenna body;

a first straight hinge line in the antenna body which extends across opposite edges of the antenna body and through a hinge convergence point in the antenna body to create a first folding hinge and a second folding hinge which extend in opposite directions from the hinge convergence point;

a second straight hinge line in the antenna body which extends across opposite edges of the antenna body and through the hinge convergence point to create a third folding hinge and a fourth folding hinge which extend in opposite directions from the hinge convergence point, wherein second straight hinge line is perpendicular to first straight hinge line; and a third straight hinge line in the antenna body which extends across opposite edges of the antenna body and through the hinge convergence point to create a fifth folding hinge and a sixth folding hinge which extend in opposite directions from the hinge convergence point, wherein the third straight line cuts midway between the first folding hinge and the fourth folding hinge and also cuts midway between the second folding hinge and the third folding hinge, wherein the first straight hinge line, the second straight hinge line, and the third straight hinge line define in the antenna body: a first pair of opposing 90-degree segments, a second pair of adjacent 45-degree segments separated from one another by the fifth folding hinge, and a third pair of adjacent 45-degree segments separated from one another by the sixth folding hinge, wherein the antenna is foldable from an unfolded configuration by folding the second pair of adjacent 45-degree segments inwardly about the fifth folding hinge, and folding the third pair of adjacent 45-degree segments inwardly about the sixth folding hinge, wherein the antenna body comprises: a top film layer, a bottom film layer, and a panels layer comprising reflectarray panels between the top film layer and the bottom film layer, and wherein the top film layer and the bottom film layer include cuts and creases that create the first straight hinge line, the second straight hinge line, and the third straight hinge line in the antenna body.

2. The antenna of claim 1, wherein the antenna body has a circular geometry, and wherein the hinge convergence point is the center point of the antenna body.

3. The antenna of claim 1, the antenna body further comprising a backing layer comprising polylactic acid between the panels layer and the bottom layer.

4. The antenna of claim 3, wherein the panels layer is bonded to backing layer via an adhesive.

5. The antenna of claim 1, where the top film layer and the bottom film layer comprise Kapton® film.

6. The antenna of claim 1, wherein the top film layer comprises a cut which constructs the third straight hinge line, a first crease which constructs the first straight hinge line, and a second crease which constructs the second straight hinge line.

7. The antenna of claim 6, wherein the bottom film layer comprises: a crease which constructs the third straight hinge line, and is aligned with the cut of the top film layer; a first cut which constructs the first straight hinge line and is aligned with the first crease in the top film layer; and a second cut which constructs the second straight hinge line and is aligned with the second crease of the top film layer.

8. The antenna of claim 6, wherein the panels layer comprises six reflectarray panels which correspond to the first pair of opposing 90-degree segments, the second pair of adjacent 45-degree segments, and the third pair of adjacent 45-degree segments.

* * * * *